United States Patent [19]

Toyoda

[11] Patent Number: 5,124,870
[45] Date of Patent: Jun. 23, 1992

[54] THIN FILM MAGNETIC HEAD HAVING MULTILAYER WINDING STRUCTURE

[75] Inventor: Atsushi Toyoda, Hamamatsu, Japan

[73] Assignee: Yamaha Corporation, Hamamatsu, Japan

[21] Appl. No.: 429,652

[22] Filed: Oct. 31, 1989

[30] Foreign Application Priority Data

Oct. 31, 1988 [JP] Japan .................. 63-275730

[51] Int. Cl.$^5$ ............................................. G11B 5/147
[52] U.S. Cl. ...................... 360/126; 360/123; 360/110; 360/122
[58] Field of Search ............... 360/110, 122, 123, 126; 336/200

[56] References Cited

U.S. PATENT DOCUMENTS

| | | | |
|---|---|---|---|
| 3,148,347 | 9/1964 | Morrison | 360/110 |
| 3,505,569 | 4/1970 | Schweizerhof | 336/200 |
| 3,549,825 | 12/1970 | Trimble | 360/110 |
| 3,798,059 | 3/1974 | Astle et al. | 336/200 |
| 3,848,210 | 11/1974 | Felkner | 336/200 |
| 3,855,561 | 12/1974 | Gottschalt | 336/83 |
| 4,694,368 | 9/1987 | Bischoff et al. | 360/123 |
| 4,841,402 | 6/1989 | Imanaka et al. | 360/126 |

FOREIGN PATENT DOCUMENTS

| | | | |
|---|---|---|---|
| 58-137125 | 8/1983 | Japan | 360/123 |
| 59-207013 | 11/1984 | Japan | 360/123 |
| 62-273611 | 11/1987 | Japan | |

Primary Examiner—Aristotelis Psitos
Assistant Examiner—Alfonso Garcia
Attorney, Agent, or Firm—Burns, Doane, Swecker & Mathis

[57] ABSTRACT

In a thin film magnetic head having a multilayer structure, a plurality of coil conductive layers are piled up to be formed between a lower magnetic layer and an upper magnetic layer. Each coil conductive layer is formed by one spiral-wound coil. The number of turns of the coil of the upper-side coil conductive layer is set smaller than that of the coil of the lower-side coil conductive layer. These coils are connected together such that first and second portions of the connected coils are respectively connected to a center terminal which is provided at the middle position of the connected coils. Thus, the number of turns of the first portion of the connected coils is set identical to that of the second portion of the connected coils. In addition, the winding direction of the first portion is set reverse to that of the second portion. Such coil conductive layers are surrounded by and buried in an insulation layer formed between the lower magnetic layer and upper magnetic layer. Due to the above-mentioned structure, the coil of each coil conductive layer can be easily formed within the insulation layer. Further, the reproduction output and the efficiency of the magnetic circuit can be improved.

3 Claims, 3 Drawing Sheets

THIN FILM MAGNETIC HEAD HAVING MULTILAYER WINDING STRUCTURE

BACKGROUND OF THE INVENTION

1. Field of the Invention

The present invention relates to a thin film magnetic head, and more particularly to a thin film magnetic head having a multilayer structure.

2. Prior Art

Conventionally, a coil conductive layer of the thin film magnetic head makes use of a coil which is wound by the bifilar winding or balance winding.

FIG. 1 is a sectional view showing the thin film magnetic head of the balance winding. In FIG. 1, 1 designates a slider base on which a lower magnetic layer 3 is formed via a lower protective layer 2. On this lower magnetic layer 3, a non-magnetic layer 4 is formed. On this layer 4, a coil conductive layer 6 is formed via an insulating layer 5, where it is sandwiched and surrounded by this insulating layer 5. On the uppermost part of the thin film magnetic head, an upper magnetic layer 7 is formed. The above-mentioned coil conductive layer 6 is formed by a coil 15 which is spiral-wound. In this coil 15 as shown in FIG. 2, a center terminal 8 is provided between a start terminal 10 and an end terminal 9. Further, a first coil 6a is formed between the terminals 8, 9, while a second coil 6b is formed between the terminals 8, 10. The number of turns and winding pitch of the coil 6a are set identical to those of another coil 6b, by which the balanced winding construction is made.

FIG. 3 is a sectional view showing another thin film magnetic head of the bifilar winding. In FIG. 3, as similar to FIG. 1, the lower protective layer 2, lower magnetic layer 3 and non-magnetic layer 4 are formed on the slider base 1 in the upward direction. On the layer 4, three coil conductive layers 11a, 11b, 11c, four insulating layers 12a, 12b, 12c, 12d are formed, on which the upper magnetic layer 7 is further formed. Each of the coil conductive layers 11a, 11b, 11c is configured by each of bifilar-wound coils 17a, 17b, 17c which is made by two conductive coils each having the same number of turns and same winding pitch in parallel. These coils 17a, 17b, 17c are connected together as shown by the dotted lines of FIG. 4 such that the two coils are provided respectively between a center terminal 12 and a start terminal 13 and between a center terminal 12 and an end terminal 14.

In the thin film magnetic head of the balance winding described before, if the coil conductive layer is made as the single layer, two coils should be formed in such single layer, so that the number of turns must be limited. This makes the reproduction output of the thin film magnetic head small. In order to increase the reproduction output, the coil conductive layer can be made as the multi-layer construction by which the number of turns can be increased. However, since the number of turns and winding pitch in the balance winding are set identical in each layer, a step difference like a step of the stairs is formed between the coil conductive layers. This affects the upper magnetic layer so that a discontinuous point is formed in the magnetic circuit. This will reduce the reproduction efficiency. In addition, when the coil conductive layer is made a the multi-layer construction as described above, the diameter of the coil in the lower layer is set identical to that of the coil in the upper layer. Thus, in order to obtain the predetermined inclination at the upper magnetic layer, the length of the lower magnetic layer should be longer, which affects the design of the thin film magnetic head.

Next, in the thin film magnetic head of the bifilar winding, two coils are wound in parallel. Therefore, it is not required that the two coils in each coil conductive layer have the same number of turns. On the other hand, it is required that the terminals ar provided in the two coils in each layer. Therefore, it becomes difficult to store and bury such coil conductive layer within the insulating layer due to the terminals.

SUMMARY OF THE INVENTION

It is accordingly a primary object of the present invention to provide a thin film magnetic head in which the reproduction output can be raised and the efficiency of the magnetic circuit can be also raised.

It is another object of the present invention to provide a thin film magnetic head in which the coil conductive layer has the reasonable size so that it can be formed within the insulating layer with ease.

In a first aspect of the present invention, there is provided a thin film magnetic head having a multilayer structure comprising:

(a) a lower magnetic layer;
(b) an upper magnetic layer;
(c) a plurality of coil conductive layers piled up between the lower magnetic layer and the upper magnetic layer, each of the plurality of coil conductive layers being formed by one coil which is wound in a spiral manner, a number of turns of the coil in an upper-side coil conductive layer being set smaller than that of the coil in a lower-side coil conductive layer; and
(d) a terminal which is connected to a middle portion of a lowermost coil conductive layer, all of the coils in the plurality of coil conductive layers being connected together such that first and second portions of the connected coils are connected to the terminal, the first portion of the connected coils being wound in a counterclockwise direction with respect to the terminal, while the second portion of the connected coil being wound in a clockwise direction with respect to the terminal, wherein a number of turns of the first portion of the connected coils is set identical to that of the second portion of the connected coils.

In a second aspect of the present invention, there is provided a thin film magnetic head comprising:

(a) a slider base;
(b) a lower protective layer formed on the slider base;
(c) a lower magnetic layer formed on the lower protective layer;
(d) a non-magnetic layer formed on the lower magnetic layer;
(e) a plurality of coil conductive layers each formed by a spiral-wound coil, a number of turns of the coil in an upper-side coil conductive layer being set smaller than that of the coil in a lower-side coil conductive layer, all of the coils being connected together such that first and second portions of the connected coils are connected to a center terminal which is connected to a middle point of the connected coils, the first portion of the connected coils being wound in a counterclockwise direction with respect to the center terminal but the second portion of the connected coils being wound in a clockwise direction with respect to the center terminal, the center terminal being positioned such that number of turns of the first portion of the connected coils is identical to that of the second portion of the connected coils;

(f) an insulating layer formed on the non-magnetic layer such that the plurality of coil conductive layers are surrounded by and buried in the insulating layer; and (g) an upper magnetic layer formed on the insulating layer, whereby a smooth inclination is given to an edge portion of the coil conductive layers due to a reduction in the numbers of turns of the coils in the coil conductive layers which are piled up.

BRIEF DESCRIPTION OF THE DRAWINGS

Further objects and advantages of the present invention will be apparent from the following description, reference being had to the accompanying drawings wherein a preferred embodiment of the present invention is clearly shown.

In the drawings.

DESCRIPTION OF A PREFERRED EMBODIMENT

[A] basic construction

This invention relates to the thin film magnetic head having the multilayer structure in which plural coil conductive layers are formed between the upper magnetic layer and lower magnetic layer. In each coil conductive layer, one conductive coil is formed by the spiral winding. The number of turns of the coil in the upper coil conductive layer is set smaller than that of the coil in the lower coil conductive layer. Then, a terminal is formed at the middle of the coil of the lowermost coil conductive layer. The coils are connected together such that one coil is wound in the counterclockwise direction but the other is wound in the clockwise direction with respect to the above-mentioned terminal. In this case, the number of turns of one coil is set identical to that of the other.

Due to the above-mentioned multilayer structure of the coil conductive layers, the whole number of turns can be increased so that the reproduction output can be increased as compared to the conventional thin film magnetic head. In addition, since only one coil is formed in each coil conductive layer, it can be easily formed within the insulating layer. Further, the smooth inclination can be given to the edge portion of the coil conductive layers which are piled up. Thus, any step difference is not formed in the upper magnetic layer so that the efficiency of the magnetic circuit will become high. Furthermore, since the inclination shape at the edge portion of the coil conductive layers coincides with the trapezoidal shape of the thin film magnetic head, it is possible to design the magnetic head having the optimum shape with ease.

[B] PREFERRED EMBODIMENT

Next, description will be given with respect to a preferred embodiment of the present invention in conjunction with FIGS. 5 and 6.

Figure 1:
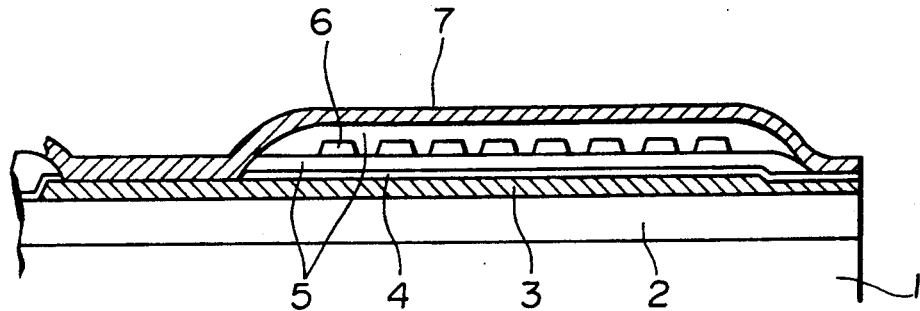
FIG. 1 is a sectional view showing the conventional thin film magnetic head of the balance winding.
Figure 2:
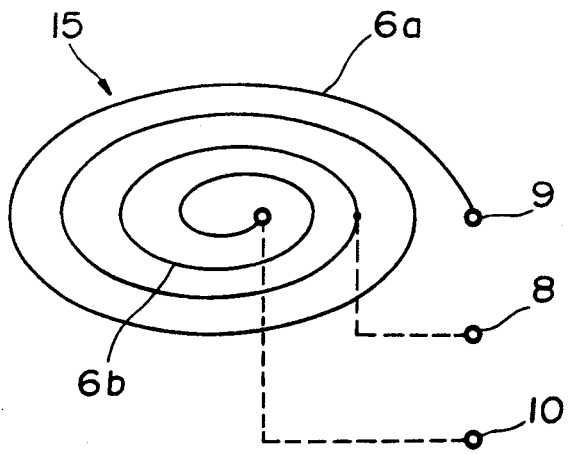
FIG. 2 is a conceptional view showing the connection of the coils in the balance winding.
Figure 3:
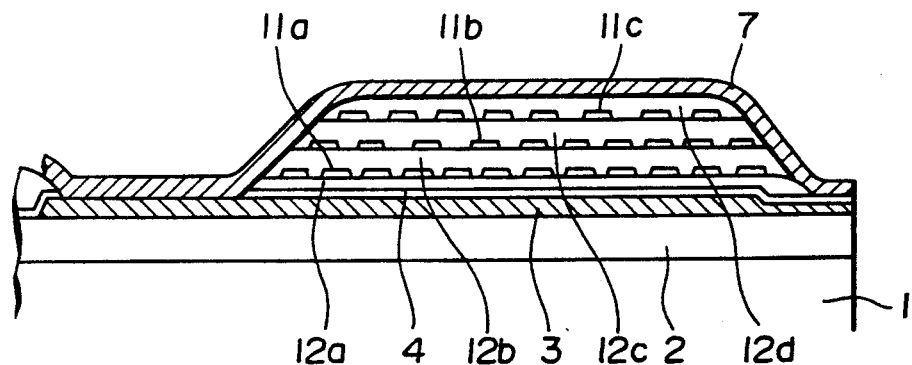
FIG. 3 is a sectional view showing the conventional thin film magnetic head of the bifilar winding.
Figure 4:
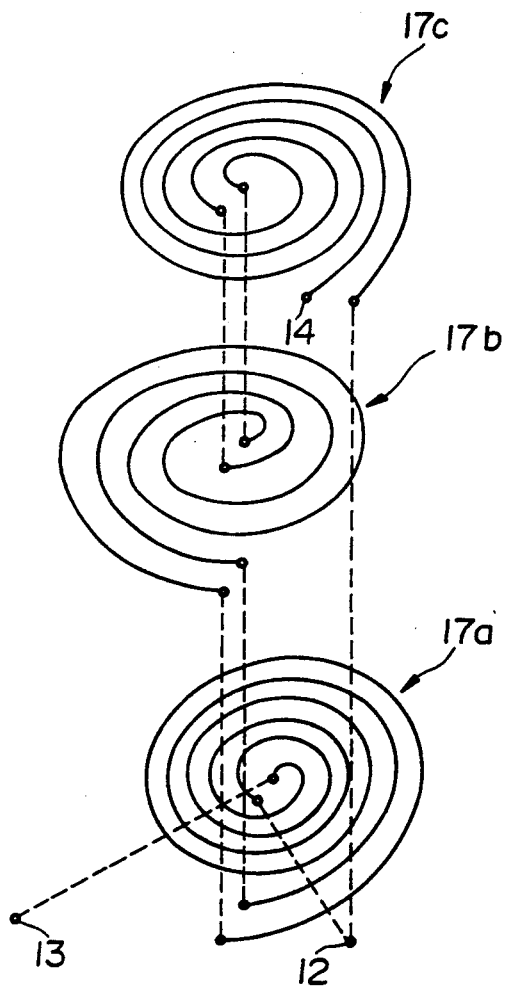
FIG. 4 is a conceptional view showing the connection of the coils in the bifilar winding.
Figure 5:
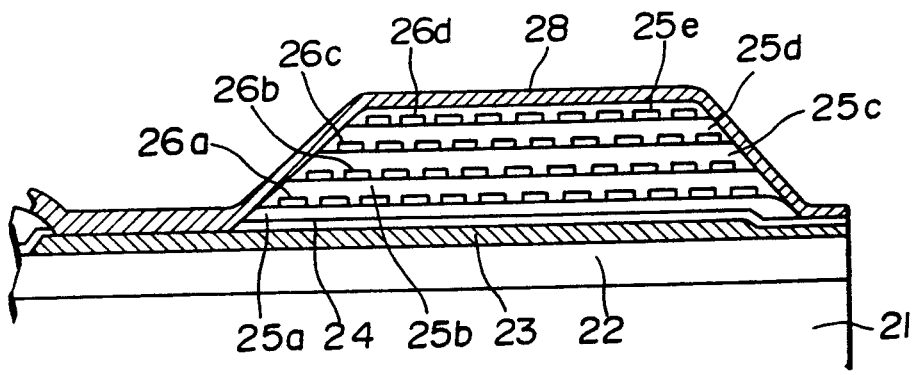
FIG. 5 is a sectional view showing the thin film magnetic head according to an embodiment of the present invention.

In FIG. 5, 21 designates a slider base on which a lower magnetic layer 23 is formed via a lower protective layer 22. In order to form the gap, a first insulating layer 25a is formed on the lower magnetic layer 23 via a non-magnetic layer 24. On this layer 25a, a first coil conductive layer 26a is formed. Further, on this coil conductive layer 26a, a second insulating layer 25b, a second coil conductive layer 26b, a third insulating layer 25c, a third coil conductive layer 26c, a fourth insulating layer 25d, a fourth coil conductive layer 26d and a fifth insulating layer 25e are respectively formed in the upward direction of FIG. 5. At the uppermost position of this thin film magnetic head, an upper magnetic layer 28 is formed such that it covers all of the insulating layers 25a, 25b, 25c, 25d, 25e and coil conductive layers 26a, 26b, 26c, 26d.

Figure 6:
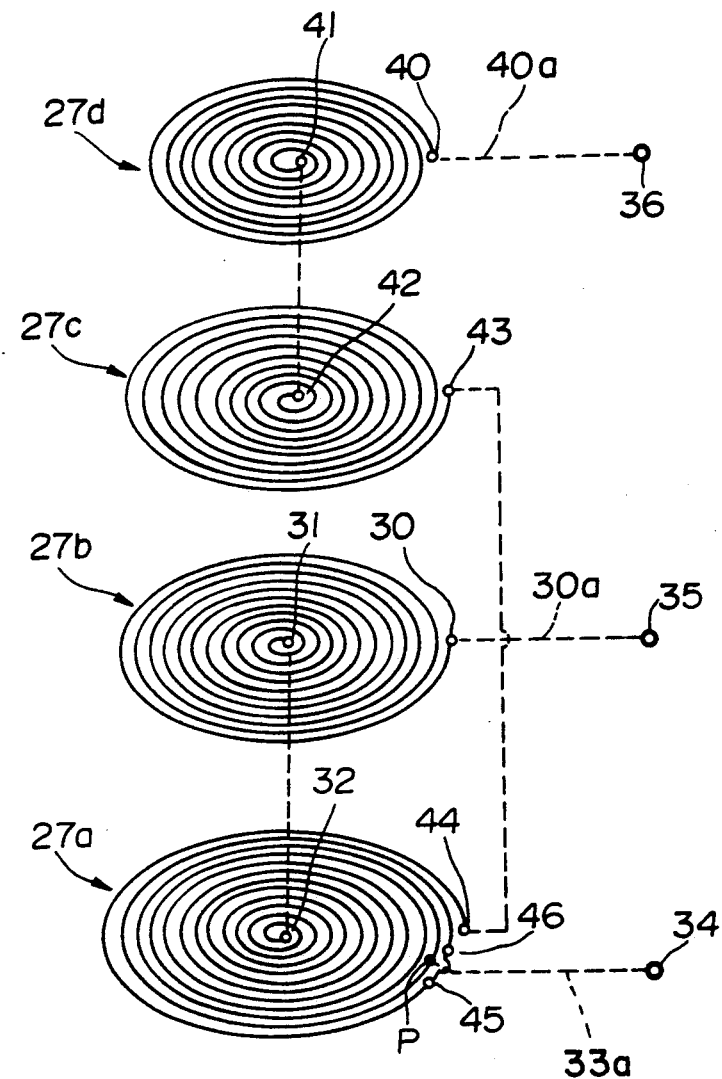
FIG. 6 is a conceptional view showing the connection of the coils in the coil conductive layers of the thin film magnetic head shown in FIG. 5.

FIG. 6 is a conceptional view showing the construction of each coil conductive layer and the connection between the coil conductive layers.

In each coil conductive layer, one conductive coil is wound in the spiral manner. Thus, coils 27a, 27b, 27c, 27d are formed as shown in FIG. 6. The number of turns of these coils 27a to 27d become lower from the lower side to the upper side. More specifically, the numbers of turns of these coils 27a, 27b, 27c, 27d are set at "12", "11", "10", "9" respectively. Both of the coils 27a, 27d are wound in the clockwise direction with respect to its start terminals 32, 41. On the other hand, the coils 27b, 27c are both wound in the counterclockwise direction with respect to its start terminals 31, 42.

Next, description will be given with respect to the connections of these coils 27a to 27d.

First, a point P is formed at the second winding from an end terminal 44 of the coil 27a. In addition, an extension line 33a is connected between this point P and an external terminal 34. In order to avoid the crossing between the extension line 33a and the coil 27a, terminals 45, 46 are provided at the periphery portion of the coil 27a. These terminals 45, 46 are connected together in the insulating layer 25c. A start terminal 32 of the coil 27a is connected to a start terminal 31 of the coil 27b; an end terminal 30 of the coil 27b is connected to a start terminal 35 via an extension line 30a. Thus, a first partial coil of 10-turns which is a part of the first coil 27a is connected to the point P in the counterclockwise direction. Therefore, the coil of 21-turns including the above-mentioned first partial coil of 10-turns and second coil 27b of 11-turns is connected to the point P in the counterclockwise direction.

Next, an end terminal 44 of the coil 27a is connected to an end terminal 43 of the coil 27c; a start terminal 42 of the coil 27c is connected to a start terminal 41 of the coil 27d; and an end terminal 40 of the coil 27d is connected to an end terminal 36 via an extension line 40a. Thus, a second partial coil of 2-turns which is another part of the coil 27a is connected to the point P in the clockwise direction. Therefore, the coil of 21-turns including the above-mentioned second partial coil of 2-turns, coil 27c of 10-turns and coil 27d of 9-turns is connected to the point P in the clockwise direction.

As described heretofore, the coils 27a, 27b, 27c, 27d are respectively formed from the lower side to the upper side, while the numbers of turns thereof are reduced by "1" respectively. Then, these four coils are connected together with respect to the point P. As a result, one coil as a whole which is wound in one direction is formed between the terminals 35, 36. In addition, the number of turns of the coil formed between the point P and start terminal 35 representing, for example, a first portion of the coil, is set identical to that of another exemplary portion of the coil formed between the point P and end terminal 36. Therefore, the terminal 34 coupled to the point P may be the center terminal of the whole coil body.

What is claimed is:

1. A thin film magnetic head having a multilayer structure comprising:
    (a) a lower magnetic layer;
    (b) an upper magnetic layer;
    (c) a plurality of coil conductive layers located between said lower magnetic layer and said upper magnetic layer, each of said plurality of coil conductive layers being formed by one coil which is wound in a spiral manner, a number of turns of a first coil being set smaller than a number of turns of a second coil, wherein said plurality of coil conductive layers are grouped into a lower-side portion and an upper-side portion; and
    (d) a terminal which is connected to a predetermined portion of one of said plurality of coil conductive layers wherein a first portion of said multilayer structure includes the upper-side portion and a first part of said one coil conductive layer, one end of said first part being connected to the upper-side portion and another end of said first part being connected to the terminal, and wherein a second portion includes a second part of said one coil conductive layer, all of said coils in said plurality of coil conductive layers being connected together, connected coils of said first portion being wound in a counterclockwise direction with respect to said terminal, and connected coils of said second portion being wound in a clockwise direction with respect to said terminal, wherein a number of turns of said first portion of the connected coils is set identical to that of said second portion of the connected coils.

2. A thin film magnetic head according to claim 1 wherein said plurality of coil conductive layers are surrounded by and buried in an insulating layer which is formed between said lower magnetic layer and said upper magnetic layer.

3. A thin film magnetic head comprising:
    (a) a slider base;
    (b) a lower protective layer formed on said slider base;
    (c) a lower magnetic layer formed on said lower protective layer;
    (d) a non-magnetic layer formed on said lower magnetic layer;
    (e) a plurality of coil conductive layers arranged to form a lower side portion and an upper side portion, each of said coil conductive layers being formed by a spiral-wound coil, a number of turns of a first coil conductive layer being set smaller than a number of turns of a second coil conductive layer, wherein a first portion of said magnetic head includes the upper-side portion and a first part of a lowermost coil conductive layer, one end of said first part being connected to the upper-side portion and another end of said first part being connected to a center terminal, and wherein a second portion of said magnetic head includes a second part of the lowermost coil conductive layer, all of said coils being connected together, connected coils of said first portion being wound in a counterclockwise direction with respect to said center terminal and connected coils of said second portion being wound in a clockwise direction with respect to said center terminal, said center terminal being positioned such that a number of turns of said first portion of the connected coils is identical to that of said second portion of the connected coils;
    (f) an insulating layer formed on said non-magnetic layer such that said plurality of coil conductive layers are surrounded by and buried in said insulating layer; and
    (g) an upper magnetic layer formed on said insulating layer,
whereby a location of an outer edge portion of successive spiral wound coil conductive layers varies due to a reduction in the number of coil turns included in each respective coil conductive layer.

* * * * *